United States Patent Office 3,431,256
Patented Mar. 4, 1969

3,431,256
16α,17α-ETHYLENE AND SUBSTITUTED ETHYLENE PREGNANE DERIVATIVES AND PROCESS
John A. Zderic, Mexico City, Mex., assignor to Syntex Corporation, Panama, Panama, a corporation of Panama
No Drawing. Filed Feb. 14, 1966, Ser. No. 527,084
U.S. Cl. 260—397.3       16 Claims
Int. Cl. C07c *169/34, 169/30, 173/00*

ABSTRACT OF THE DISCLOSURE

New 16α,17α-ethylene and 16α,17α-substituted ethylene derivatives of the pregnane series prepared by photochemical addition of an olefin or substituted olefin to a $\Delta^{16}$-ene of the pregnane series useful as progestational agents.

---

This invention relates to novel cyclopentanophenanthrene derivatives and to a process for the production thereof. More specifically this invention relates to novel 16α,17α-ethylene and 16α,17α-substituted ethylene derivatives of the pregnane series.

The compounds of the present invention may be represented by the following formula:

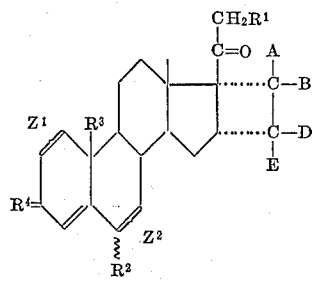

wherein $Z^1$ is a carbon-carbon single bond, a carbon-carbon double bond or the group $$\overset{..}{\underset{..}{C}}XY$$

bridging the C–1 and C–2 carbon atoms, each of X and Y being hydrogen, chloro or fluoro;

$Z^2$ is a carbon-carbon single bond, a carbon-carbon double bond or the group $$\overset{..}{\underset{..}{C}}X'Y'$$

bridging the C–6 and C–7 carbon atoms, each of X' and Y' being hydrogen, chloro or fluoro;

$R^1$ is hydrogen, chloro or fluoro;

$R^2$ is hydrogen, chloro, fluoro, methyl or trifluoromethyl, $R^2$ being in the β-configuration when $Z^2$ is the group $$\overset{..}{\underset{..}{C}}X'Y'$$

and $R^2$ being in either the α- or β-configuration when $Z^2$ is a carbon-carbon single bond;

$R^3$ is hydrogen or methyl, $R^3$ being methyl when $Z^1$ is the carbon-carbon double bond;

$R^4$ is an oxygen atom or the group $$R^5O-\overset{H}{\underset{..}{:}}$$

in which $R^5$ is hydrogen, tetrahydropyranyl or a hydrocarbon carboxylic acyl group of less than 12 carbon atoms, $R^4$ being an oxygen atom when Z' is a double bond;

Each of A and B is hydrogen, chloro, fluoro or an alkyl group of from 1 to 4 carbon atoms;

Each of D and E is hydrogen, chloro, fluoro, phenyl, an alkyl group of from 1 to 4 carbon atoms, an alkoxy group of from 1 to 4 carbon atoms; or a haloalkyl group of from 1 to 4 carbon atoms; and A and B or D and E taken together are methylene or difluoromethylene.

The compounds of the present invention demonstrate hormonal properties characteristic of progestational agents and are useful in fertility control and the management of various menstrual disorders. The compounds also possess hormonal properties characteristic of anti-androgenic, anti-gonadotrophic and anti-estrogenic agents. These compounds may be administered via usual routes in the standard pharmaceutical compositions and at dosages appropriate for the particular condition being treated.

The compounds of the present invention are prepared from intermediates of the following formula:

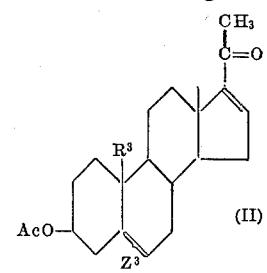

wherein $R^3$ is as defined above. Ac is acyl, and $Z^3$ is a carbon-carbon double bond or a carbon-carbon single bond, the configuration of the hydrogen atom in the 5-position being either α or β. Thus a compound of Formula II is treated with an olefin of the formula:

wherein each of A, B, D and E is as previously defined, while irradiating with ultraviolet light of a wavelength in the range of about 270 to 330 mμ in the presence of an inert organic solvent such as benzene, dioxane and the like, preferably benzene. Under these conditions the olefin adds across the $\Delta^{16}$-double bond with the orientation of the resulting substituted ethylene group with respect to the carbon atoms at 16, 17 positions being predominantly α.

While the time for this reaction will in part be dependent upon the reactivity of the reagents, a reaction time of a few hours, e.g., 4 to 5 hours is generally adequate for ethylene and for substituted olefins whose substituents contribute a positive inductive effect to the double bond, such as alkyl. Longer periods for the reaction time e.g. up to 40 or 50 hours may be required for those olefins whose substituents contribute a negative inductive effect to the double bond, such as fluoro or chloro. In any event, the progress of the reaction may be readily followed by observing the U.V. spectra of the reaction mixture. This reaction may be represented as follows:

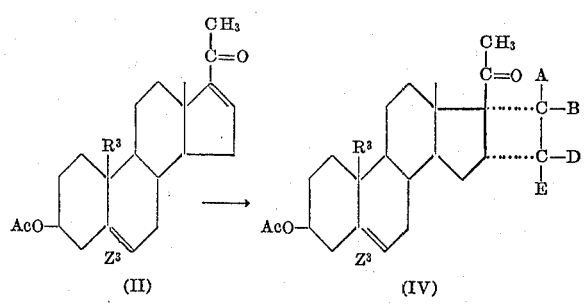

Further elaboration of the product of the principal reaction may be represented by the following general reaction scheme. A 21-chloro or fluoro substituent is introduced, preferably at this stage, but alternatively at a later stage, by treatment with bromine to give a 21-bromo intermediate, and treatment of the intermediate with a molar equivalent of lithium chloride in dimethylformamide or a molar equivalent of silver fluoride in acetonitrile to afford the 21-chloro or 21-fluoro compounds of the present invention, respectively.

In those instances in which $Z^1$ is a methylene or dihalomethylene substituent bridging the $1\alpha,2\alpha$-positions, the compounds of Formula IV, wherein $Z^3$ is a carbon-carbon single bond and the configuration of the hydrogen atom in the 5-position is $\alpha$, are hydrolyzed as with potassium bicarbonate in methanol to yield the corresponding 3-hydroxy derivative, which is converted to the corresponding 3-keto compound through treatment with chromic trioxide in pyridine. Bromination of this keto compound as with bromine in acetic acid, followed by dehydrobromination of the resulting 2-bromo intermediate as with calcium carbonate, next yields the $16\alpha,17\alpha$-ethylene-$5\alpha$-pregn-1-ene-3,20-dione. This $\Delta^1$ compound is then allowed to react with an alkali or alkaline earth metal salt of an acid having a formula WCXYCOOH in which W is chloro or iodo and each of X and Y is hydrogen, fluoro or chloro, at least one of X and Y being other than hydrogen. When a $1\alpha,2\alpha$-methylene substituent is desired, this group is introduced through the action of dimethylsulfoxonium methylide in dimethylsulfoxide, preferably after reducing the keto groups in the 3- and 20-position with sodium borohydride and back-oxidizing the 3-hydroxy group with manganese dioxide or 2,3-dichloro-5,6-dicyanobenzoquinone. The 20-keto group may be regenerated after introduction of the $1\alpha,2\alpha$-methylene group by simple oxidation with chromic trioxide in pyridine. Bromination of the resultant $1\alpha,2\alpha$-methylene-3-keto compound and dehydrobromination as described above yields the corresponding 3-keto-$\Delta^4$ derivative.

The compounds of Formula IV wherein $Z^3$ is a double bond may be converted to the 3-keto-$\Delta^4$ derivatives directly through hydrolysis as described above to yield the 3-hydroxy derivative, followed by oxidation under conventional Oppenauer conditions.

With the exception of a methyl group, a 6-substituent is next introduced through formation of the enol ether as by the action of ethyl orthoformate and an acid catalyst such as p-toluenesulfonic acid. Fluorination of the intermediate with perchloryl fluoride, followed by acid isomerization, affords the 3-keto-$6\alpha$-fluoro-$\Delta^4$-ene compounds while treatment of the enol ether intermediate with N-chlorosuccinimide, followed by acid isomerization, affords the $6\alpha$-chloro compounds. Irradiation of the intermediate in iodotrifluoromethane affords the $6\alpha$-trifluoromethyl compounds. A 6-methyl substituent is introduced by first protecting the 20-keto group of a compound of Formula IV wherein $Z^3$ is a double bond through formation of a ketal, treating the $\Delta^5$-ene with monoperphthalic acid in chloroform to give a $5\alpha,6\alpha$-oxido intermediate and allowing the thus-formed intermediate to react with a methyl Grignard reagent. The thus-formed 3-keto-$5\alpha$-hydroxy-$6\beta$-methyl compound is readily converted to the 3-keto-$6\alpha$-methyl-$\Delta^4$-ene compounds through treatment with sodium hydroxide.

Introduction of the 4,6-diene system may next be accomplished either by the action of chloranil in t-butanol or xylene, or through initial formation of the enol ether as previously described, followed by treatment of this enol ether with 2,3-dichloro-5,6-dicyano-1,4-benzoquinone.

Treatment of 3-keto-$\Delta^{4,6}$-diene with sodium chlorodifluoroacetate or with dimethylsulfoxonium methylide in the manner previously described yields the corresponding derivative having a difluoromethylene or methylene group respectively bridging the $6\alpha,7\alpha$-carbon atoms.

Introduction of the 3-keto-$\Delta^{1,4}$-diene system is effected in a conventional manner, as for example by the action of 2,3-dichloro-5,6-dicyanobenzoquinone, while conversion of a 3-keto-$\Delta^{4,6}$-diene to the corresponding 3-keto-1,4,6-triene may be accomplished via the action of chloranil. The 3-tetrahydropyranyl or 3-acyloxy group is introduced by reduction of 3-keto-$\Delta^4$-ene with an alkali metal hydride such as sodium borohydride in an inert solvent such as tetrahydrofuran to afford a 3-hydroxy group and treatment of the 3-hydroxy group with dihydropyran and p-toluenesulfonic acid in an inert solvent to yield the corresponding 3-tetrahydropyranyloxy compounds of the present invention. In a similarly conventional manner, treatment of the 3-hydroxy compound with a molar equivalent of a hydrocarbon carboxylic acid chloride or a hydrocarbon carboxylic acid anhydride in pyridine gives the 3-acyloxy compounds. The hydrocarbon carboxylic acyl group of the present invention will contain less than 12 carbon atoms and may be of a straight, branched, cyclic or cyclic-aliphatic chain structure. This structure may be saturated, unsaturated or aromatic and optionally substituted by groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, $\beta$-chloropropionate, adamantoate and the like.

The following examples will describe the present invention with specific embodiments and applications; other modifications thereof will be readily apparent to those skilled in the art without department from the spirit and scope of the invention as defined in the appended claims. In the naming of the $16\alpha,17\alpha$-ethylene derivatives it is understood that in connection with the substituents D and E, the carbon atoms attached to the C–16 carbon atom of the steroid nucleus is designated as 1', and in connection with the substituents A and B, the carbon atom attached to the C–17 carbon atoms of the steroid nucleus is designated at 2'.

EXAMPLE 1

A mixture of 1 g. of $3\beta,17\alpha$-dihydroxy-$5\alpha$-pregnan-20-one, 4 ml. of pyridine and 2 ml. of acetic anhydride is allowed to stand at room temperature for 15 hours. The mixture is then poured into ice water and the solid which forms is collected by filtration, washed with water and dried to yield $3\beta$-acetoxy-$17\alpha$-hydroxy-$5\alpha$-pregnan-20-one which may be further purified through recrystallization from acetone:hexane.

To a suspension of 1 g. of $3\beta$-acetoxy-$17\alpha$-hydroxy-$5\alpha$-pregnan-20-one in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield $3\beta$-acetoxy-$17\alpha$-hydroxy-$5\alpha$-pregnan-20-semicarbazone which is recrystallized from pyridine:methanol.

A solution of 1 g. of $3\beta$-acetoxy-$17\alpha$-hydroxy-$5\alpha$-pregnan-20-semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dried over magnesium sulfate and evaporated to dryness under reduced pressure. The residue is chromatographed on neutral alumina with benzene to yield $3\beta$-acetoxy-$5\alpha$-pregn-16-en-20-one which may be recrystallized from acetone:ether.

A mixture of 2.0 g. of $3\beta$-acetoxy-$5\alpha$-pregn-16-en-20-one in 140 ml. of benzene is irradiated with a 70 watt Hanan high pressure mercury vapor lamp with a Pyrex filter at room temperature while bubbling ethylene through the solution. At the end of the reaction time which may be determined by U.V. spectroscopy, the reaction mixture is evaporated to dryness, chromatographed on silica and the product eluted with ethyl acetate·benzene to yield 3β-acetoxy-16α,17α-ethylene-5α-pregnan-20-one which is recrystallized from methanol:methylene chloride.

One gram of 3β-acetoxy-16α,17α-ethylene-5α-pregnan-20-one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 3β-hydroxy-16α,17α-ethylene-5α-pregnan-20-one which is collected by filtration and recrystallized from acetone: hexane.

To a stirred solution of 1 g. of 3β-hydroxy-16α,17α-ethylene-5α-pregnan-20-one in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 16α,17α-ethylene-5α-pregnan-3,20-dione which may be further purified by recrystallization from acetone:hexane.

To a stirred solution of 1 g. of 16α,17α-ethylene-5α-pregnan-3,20-dione and 6.6 g. of p-toluenesulfonic acid in 300 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and solid which forms is collected and dissolved in methylene chloride. This solution is washed with water, dilute sodium bicarbonate solution and water, dried and evaporated to dryness. The resiue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. The residue is chromatographed on acid washed alumina with 3:1 benzene:chloroform to yield 16α,17α-ethylene-5α-pregn-1-en-3,20-dione which may be recrystallized from cyclohexane:ethyl acetate.

A solution of 45 equivalents of sodium chlorodifluoroacetate in 50 ml. of triethylene glycol dimethyl ether is added in a dropwise fashion to a refluxing solution of 16α,17α-ethylene-5α-pregn-1-en-3,20-dione in 10 ml. of triethylene glycol dimethyl ether. Refluxing is discontinued upon the absence of any change in the U.V. spectra and the mixture is then filtered and evaporated to dryness under reduced pressure. The residue is then heated at reflux for one hour with a 1% methanolic solution of potassium hydroxide. At the end of this time, the reaction mixture is neutralized with dilute hydrochloric acid and evaporated to dryness. The residue is then chromatographed on alumina with methylene chloride to yield 1α,2α-difluoromethylene-16α,17α-ethylene-5α-pregnane-3,20-dione.

To a stirred solution of 1 g. of 1α,2α-difluoromethylene-16α,17α-ethylene-5α-pregnane-3,20-dione and 6.6 g. of p-toluenesulfonic acid in 330 ml. of glacial acetic acid is added over a 10 minute period, a solution of 1.1 molar equivalents of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at a reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene: chloroform to yield 1α,2α-difluoromethylene-16α,17α-ethylenepregn-4-ene-3,20-dione which may be recrystallized from cyclohexane:ethyl acetate.

Using the same procedure 3β,17α-dihydroxy-19-norpregnan-20-one gives the corresponding 19-nor compound, namely 1α,2α-difluoromethylene-16α,17α-ethylene-19-norpregn-4-en-3,20-dione.

EXAMPLE 2

A solution of 1 g. of 17α-hydroxy-19-norprogesterone and 0.1 g. of p-toluenesulfonyl chloride in 1 ml. of acetic anhydride and 100 ml. of benzene is allowed to stand at 20° C. for six hours. The organic phase is washed with water and aqueous 5% sodium bicarbonate solution to neutrality, dried over sodium sulfate and evaporated to yield 3 - acetoxy - 17α - hydroxy-19-norpregna-3,5-dien-20-one which may be crystallized from acetone:hexane.

To a stirred solution of 1 g. of 3-acetoxy-17α-hydroxy-19-norpregna-3,5-dien-20-one in 30 ml. of ethanol and 1 ml. of water, under nitrogen is added 0.84 g. of methoxy amine hydrochloride and 1.1 g. of potassium:acetate. The mixture is heated at reflux for 18 hours. The suspension is cooled and diluted with 40 ml. of water. The solid is collected by filtration, washed with water and dried to yield 3 - acetoxy - 17α-hydroxy-20-methoxyimino-19-norpregna-3,5-diene.

A solution of 6 g. of 3β-acetoxy-17α-hydroxy-20-methoxyimino-19-norpregna-3,5-diene in 100 ml. of 95% ethanol and 35 ml. of tetrahydrofuran is cooled to 10° C. and added dropwise over a 1 hour period to a stirred, cooled solution of 6 g. of sodium borohydride in 50 ml. of 80% ethanol, the reaction temperature being maintained below 5° C. Upon completion of addition, the solution is allowed to stand at 0° C. to 5° C. for 2 hours. Two hundred milliliters of 10% sodium hydroxide solution are then added and the solution heated at the boiling point for 15 minutes. The solvent is evaporated under reduced pressure and the residue is acidified with 20% hydrochloric acid. The solid which forms is collected by filtration, washed with water and dried to yield 3β,17α-dihydroxy - 20 - methoxyimino-19-norpregn-5-ene which may be further purified by recrystallization from acetone.

To a solution of 1 g. of 3β,17α-dihydroxy-20-methoxyimino-19-norpregn-5-ene in 10 ml. of pyridine at —40° C. is added quickly 0.4 ml. of thionyl chloride in 10 ml. of pyridine. The mixture is held at —40° C. under a nitrogen atmosphere for a period of 1 hour. The mixture is then poured into ice and water. The solid is collected by filtration to give 3β-hydroxy-20-methoxyimino-19-norpregna-5,16-diene. To a solution of this material in 100 ml. of acetone is added 100 ml. of 2 N hydrochloric acid and the mixture is allowed to stand at 25° C. for 72 hours. The product is extracted with chloroform and washed to neutrality with water and sodium bicarbonate solution. The solvent is removed by evaporation under reduced pressure, and the 3β-hydroxy compound is treated with 8 ml. of acetic anhydride in 10 ml. of pyridine to yield 3β-acetoxy-19-norpregna-5,16-dien-20-one.

EXAMPLE 3

A mixture of 2 g. of 3-acetoxypregna-5,16-dien-20-one in 140 ml. of benzene is irradiated with a 70 watt Hanan high pressure mercury vapor lamp with a Pyrex filter at room temperature while bubbling ethylene through the solution. At the end of reaction time, which may be determined by U.V. spectroscopy, the reaction mixture is evaporated in vacuo to dryness, chromatographed on silica and the product eluted with ethyl acetate:benzene to yield 3 - acetoxy - $16\alpha,17\alpha$ - ethylenepregn-5-en-20-one which is recrystallized from methanol:methylene chloride.

Using the same starting material and the above procedure the following olefins tetrafluoroethylene, 1',1'-difluoroethylene, butene-2, allyl chloride, 1-chloro-1,2,2-trifluoroethylene, isobutylene, 1,1 - dimethoxyethylene, vinyl acetate and styrene, afforded $3\beta$-acetoxy-$16\alpha,17\alpha$-tetrafluoroethylenepregn-5-en-20-one, $3\beta$-acetoxy-$16\alpha,17\alpha$-(1',1'-difluoro)ethylenepregn-5-en-20-one, $3\beta$-acetoxy-$16\alpha,17\alpha$-(1',2'-dimethyl)ethylenepregn-5-en-20-one, $3\beta$-acetoxy-$16\alpha,17\alpha$-(1'-chloromethyl)ethylenepregn-5-en-20-one, $3\beta$-acetoxy-$16\alpha,17\alpha$-(1'-chloro-1',2',2'-trifluoro)ethylenepregn-5-en-20-one, $3\beta$-acetoxy-$16\alpha,17\alpha$-(1',1'-dimethyl)ethylenepregn-5-en-20-one, $3\beta$-acetoxy-$16\alpha,17\alpha$-(1',1'-dimethoxy)ethylenepregn-5-en-20-one, $3\beta$-acetoxy-$16\alpha,17\alpha$-(1'-acetoxy)ethylenepregn-5-en-20-one, $3\beta$-acetoxy-$16\alpha,17\alpha$-(1'-phenyl)ethylenepregn-5-en-20-one, respectively.

Allene with the same starting material affords a mixture of the $16\alpha,17\alpha$(1'-methylene), and $16\alpha,17\alpha$(2'-methylene) products which are separated by column chromatography. The 1,1-difluoroallene likewise affords a mixture of products which are separated by column chromatography.

EXAMPLE 4

Using the same procedure and olefins described in Example 3, 3 - acetoxy - 19 - norpregna - 5,16 - dien - 20-one is allowed to react with those olefins to give the following products, namely $3\beta$-acetoxy-$16\alpha,17\alpha$-ethylene-19-norpregn-5-en-20-one, $3\beta$-acetoxy-$16\alpha,17\alpha$-tetrafluoroethylene-19-norpregn-5-en-20-one, $3\beta$-acetoxy-$16\alpha,17\alpha$-(1',1'-difluoro)ethylene-19-norpregn-5-en-20-one, $3\beta$-acetoxy-$16\alpha,17\alpha$-(2'-methylene)ethylene-19-norpregn-5-en-20-one, $3\beta$-acetoxy-$16\alpha,17\alpha$-(1',2'-dimethyl)ethylene-19-norpregn-5-en-20-one, $3\beta$-acetoxy-$16\alpha,17\alpha$-(1'-chloromethyl)ethylene-19-norpregn-5-en-20-one, $3\beta$-acetoxy-$16\alpha,17\alpha$-(1'-chloro-1',2',2'-trifluoro)ethylene-19-norpregn-5-en-20-one, $3\beta$-acetoxy-$16\alpha,17\alpha$-(2'-difluoromethylene)ethylene-19-norpregn-5-en-20-one, $3\beta$-acetoxy-$16\alpha,17\alpha$-(1',1'-dimethyl)ethylene-19-norpregn-5-en-20-one, $3\beta$-acetoxy-$16\alpha,17\alpha$-(1',1'-dimethoxy)ethylene-19-norpregn-5-en-20-one, and $3\beta$-acetoxy-$16\alpha,17\alpha$-(1'-acetoxy)ethylene-19-norpregn-5-en-20-one.

EXAMPLE 5

A solution of 5 g. of $1\alpha,2\alpha$-difluoromethylene-$16\alpha,17\alpha$-ethylenepregn-4-ene-3,20-dione in 50 ml. of acetic anhydride and 50 ml. of acetyl chloride is heated at reflux for 4 hours under nitrogen. The reaction mixture is then distilled to almost dryness, cooled and diluted with ether. The organic phase is washed with water, aqueous 5% sodium bicarbonate solution and again with water, dried over sodium sulfate and evaporated to yield $1\alpha,2\alpha$-difluoromethylene - $3\beta$ - acetoxy - $16\alpha,17\alpha$ - ethylenepregna - 3,5 - dien - 20 - one which may be recrystallized from acetone:hexane.

A solution of 6 g. of $1\alpha,2\alpha$ - difluoromethylene - $3\beta$-acetoxy - $16\alpha,17\alpha$ - ethylenepregna - 3,5 - dien - 20 - one in 100 ml. of 95% ethanol and 35 ml. of tetrahydrofuran is cooled to 10° C. and added dropwise over a 1 hour period to a stirred, cooled solution of 6 g. of sodium borohydride in 50 ml. of 80% ethanol, the reaction temperature being maintained below 5° C. Upon completion of addition, the solution is allowed to stand at 0° C. for 2 hours. Two hundred milliliters of 10% sodium hydroxide solution are then added and the solution heated at the boiling point for 15 minutes. The solvent is evaporated under reduced pressure and the residue is acidified with 20% hydrochloric acid. The solid which forms is collected by filtration, washed with water and dried to yield $1\alpha,2\alpha$ - difluoromethylene - $3\beta$ - hydroxy-$16\alpha,17\alpha$ - ethylenepregn - 5 - en - 20 - one which may be further purified by recrystallization from acetone.

A mixture of 1 g. of $1\alpha,2\alpha$-difluoromethylene-$3\beta$-hydroxy - $16\alpha,17\alpha$ - ethylenepregn - 5 - en - 20 - one, 4 ml. of pyridine and 2 ml. of acetic anhydride is allowed to stand at room temperature for 15 hours. The mixture is then poured into ice water and the solid which forms is collected by filtration, washed with water and dried to yield $1\alpha,2\alpha$ - difluoromethylene - $3\beta$ - acetoxy - $16\alpha,17\alpha$ - ethylenepregn - 5 - en - 20 - one which may be further purified through recrystallization from acetone:hexane.

Using the same procedure $1\alpha,2\alpha$-methylene-$16\alpha,17\alpha$-ethylene - 19 - norpregn - 4 - ene - 3,20 - dione is converted to $1\alpha,2\alpha$ - methylene - $3\beta$ - acetoxy - $16\alpha,17\alpha$-ethylene-19-norpregn-5-en-20-one.

EXAMPLE 6

A mixture of 2 g. of 3-acetoxy-$16\alpha,17\alpha$-ethylenepregn-5-en-20-one in 30 ml. of 2-methyl-2-ethyl-1,3-dioxolane and 70 mg. of p-toluenesulfonic acid is heated at reflux with distillation for one hour. The mixture is then cooled diluted with water and extracted with ethyl acetate. The extracts are washed to neutrality, dried and evaporated to dryness to yield 3-acetoxy-$16\alpha,17\alpha$-ethylene-20-ethylenedioxypregn-5-ene which is recrystallized from acetone:hexane.

A solution of 2.5 g. of 3-acetoxy-$16\alpha,17\alpha$-ethylene-20-ethyl-enedioxypregn-5-ene in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 3-acetoxy-$5\alpha,6\alpha$ - oxido - $16\alpha,17\alpha$ - ethylene - 20 - ethylenedioxypregnane which may be further purified by recrystallization from acetone:hexane.

To a stirred solution of 20 ml. of 4 N methylmagnesium bromide in ether is added a solution of 1 g. of 3 - acetoxy - $5\alpha,6\alpha$ - oxido - $16\alpha,17\alpha$ - ethylene - 20-ethylenedioxypregnane in 30 ml. of dry tetrahydrofuran, and the stirred mixture is heated at reflux temperatures for 30 minutes. The reflux condenser is then replaced by a calcium chloride drying tube and the ether is allowed to escape. When the internal temperature is 54° C., the condenser is returned and the mixture refluxed for an additional 4-hour period. Two hundred milliliters of a saturated ammonium chloride solution are then slowly added to the cooled mixture which is then stirred for 15 minutes and extracted with ethyl acetate. These extracts are washed with water, dried over sodium sulfate and evaporated to dryness to yield 3β,5α-dihydroxy-6β-methyl - 16α,17α - ethylene - 20 - ethylenedioxypregnane which is recrystallized from aqueous methanol.

A mixture of 5 g. of 3β,5α-dihydroxy-6β-methyl-16α, 17α - ethylene - 20 - ethylenedioxypregnane, 400 ml. of acetic anhydride and 1 drop of concentrated sulfuric acid is stirred at room temperature for 15 hours. The resulting solution is poured into water and extracted with methylene chloride. The extracts are washed with 10% aqueous sodium bicarbonate solution and then with water to neutrality, dried over sodium sulfate and evaporated to dryness. The residue is chromatographed on neutral alumina to yield 3β - hydroxy - 6 - methyl - 16α,17α-ethylene-20-ethylenedioxypregn-5-ene which further purified through recrystallization from acetone:hexane.

A mixture of 0.5 g. of 3β-hydroxy-6-methyl-16α,17α-ethylene-20-ethylenedioxypregn-5-ene in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3β-hydroxy-6-methyl-16α, 17α-ethylenepregn-5-en-20-one which is recrystallized from acetone:hexane.

EXAMPLE 7

One gram of 3β-acetoxy-16α,17α-ethylenepregn-5-en-20-one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 3β-hydroxy-16α,17α-ethylenepregn-5-en-20-one which is collected by filtration and recrystallized from acetone:hexane.

A solution of 1 g. of 3β-hydroxy-16α,17α-ethylenepregn-5-en-20-one in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 16α,17α-ethylenepregn-4-ene-3,20-dione which may be further purified by recrystallization from acetone:hexane.

To a suspension of 1 g. of 16α,17α-ethylenepregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-16α,17α-ethylenepregna-3,5-dien-20-one which is recrystallized from acetone:hexane.

Using the same procedure those final products in Examples 3 and 4 are converted to their respective analogs, namely the 3-ethoxy-Δ³,⁵-compounds.

EXAMPLE 8

A solution of 1 g. of 3-ethoxy-16α,17α-ethylenepregna-3,5-dien-20-one in iodotrifluoromethane containing pyridine is irradiated at room temperature with ultraviolet light from a high pressure mercury lamp. At the end of the reaction time which may be determined by U.V. spectroscopy, the reaction mixture is evaporated to dryness to yield 3-ethoxy-6-trifluoromethyl-16α,17α-ethylenepregna-3,5-dien-20-one which is recrystallized from pentane.

To a solution of 1 g. of 3-ethoxy-6-trifluoromethyl-16α, 17α-ethylenepregna-3,5-dien-20-one in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 6α-trifluoromethyl-16α,17α - ethylenepregn-4-ene-3,20-dione.

Using the same procedure 3-ethoxy-16α,17α-tetrafluoroethylene-19-norpregna-3,5-dien - 20 - one yields 6α - trifluoromethyl - 16α,17α - tetrafluoroethylene-19-norpregn-4-ene-3,20-dione.

EXAMPLE 9

A mixture of 5 g. of 3-ethoxy-16α,17α-ethylenepregna-3,5-dien-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-16α,17α-ethylenepregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-16α, 17α-ethylenepregn-4-ene-3,20-dione which is recrystallized from acetone:hexane.

Using the same procedure
3-ethoxy-16α,17α-ethylene-19-norpregna-3,5-
 dien-20-one,
3-ethoxy-16α,17α-tetrafluoroethylene-pregna-
 3,5-dien-20-one,
and 3-ethoxy-16α,17α-tetrafluoroethylene-
 19-norpregna-3,5-dien-20-one,
and 1α,2α-difluoromethylene-3-ethoxy-
 16α,17α-ethylenepregna-3,5-diene-20-one
and 1α,2α-difluoromethylene-3-ethoxy-16α,17α-
 (1′,1′-difluoro)ethylenepregna-3,5-diene-20-one
are converted to 6α-chloro-16α,17α-ethylene-19-
 norpregn-4-ene-3,20-dione,
6α-chloro-16α,17α-tetrafluoroethylene-pregn-
 4-ene-3,20-dione
and 6α-chloro-16α,17α-tetrafluoroethylene-19-
 norpregn-4-ene-3,20-dione,
1α,2α-difluoromethylene-6α-chloro-16α,17α-
 ethylenepregn-4-ene-3,20-dione
and 1α,2α-difluoromethylene-6α-chloro-16α,17α-
 (1′,1′-difluoro)-ethylenepregn-4-ene-3,20-dione
respectively.

EXAMPLE 10

A stream of perchloryl fluoride is passed through a solution of 1 g. of 3 - ethoxy - 16α,17α-(1′,1′-dimethoxy) ethylenepregna-3,5-dien-20-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoro-16α,17α(1',1'-dimethoxy)ethylenepregn-4-ene-3,20-dione which is recrystallized from acetone:hexane.

Using the procedure of this example
3-ethoxy-16α,17α-tetrafluoroethylenepregna-3,5-dien-20-one,
3-ethoxy-16α,17α-(1',2'-dimethyl)ethylene-19-norpregna-3,5-dien-20-one,
3-ethoxy-16α,17α-(1',1'-difluoro)ethylenepregna-3,5-dien-20-one and
3-ethoxy-16α,17α-ethylenepregna-3,5-dien-20-one
yielded 6α-fluoro-16α,17α-tetrafluoroethylenepregn-4-ene-3,20-dione,
6α-fluoro-16α-(1',2'-dimethyl)ethylene-19-norpregn-4-ene-3,20-dione,
6α-fluoro-16α,17α-(1',1'-difluoro)ethylenepregn-4-ene-3,20-dione
and 6α-fluoro-16α,17α-ethylenepregn-4-ene-3,20-dione, respectively.

EXAMPLE 11

To a suspension of 1 g. of 6α-chloro-16α,17α-ethylene-pregn-4-en-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3 - ethoxy-6-chloro-16α,17α-ethylenepregna-3,5-diene-20-one which is recrystallized from acetone:hexane.

To a solution of 1 g. of 3-ethoxy-6-chloro-16α,17α-ethylene-pregna-3,5-dien-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-chloro-16α,17α-ethylenepregna-4,6-diene-3,20-dione which may be further purified through recrystallization from acetone:hexane.

Using the same procedure other Δ$^{4,6}$-diene compounds of the present invention are prepared. Notably among these are the following:

6-chloro-16α,17α-ethylene-19-norpregna-4,6-diene-3,20-dione,
6-chloro-16α,17α-tetrafluoroethylenepregna-4,6-diene-3,20-dione,
6-chloro-16α,17α-tetrafluoroethylene-19-norpregna-4,6-diene-3,20-dione,
6-fluoro-16α,17α-tetrafluoroethylenepregna-4,6-diene-3,20-dione,
6-fluoro-16α,17α-(1',2'-dimethyl)ethylene-19-norpregna-4,6-diene-3,20-dione,
6-fluoro-16α,17α-(1',1'-difluoro)ethylenepregna-4,6-diene-3,20-dione,
6-fluoro-16α,17α-ethylenepregna-4,6-diene-3,20-dione,
6-methyl-16α,17α-ethylenepregna-4,6-diene-3,20-dione,
6-trifluoromethyl-16α,17α-ethylene-19-norpregna-4,6-diene-3,20-dione,
1α,2α-difluoromethylene-6-chloro-16α,17α-ethylene-pregna-4,6-diene-3,20-dione,
1α,2α-methylene-6-chloro-16α,17α-ethylenepregna-4,6-diene-3,20-dione, and
1α,2α-methylene-6-chloro-16α,17α-(1',1',-difluoro)ethylenepregna-4,6-diene-3,20-dione.

EXAMPLE 12

A mixture of 0.5 g. of 6α-chloro-16α,17α-ethylene-pregn-4-en-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6α-chloro-16α,17α-ethylene-pregna-1,4-diene-3,20-dione which is further purified by recrystallization from acetone:hexane.

Using the same procedure other Δ$^{1,4}$ compounds are prepared. Notably among these are the following:

6α-chloro-16α,17α-tetrafluoroethylenepregna-1,4-diene-3,20-dione,
6α-fluoro-16α,17α-tetrafluoroethylenepregna-1,4-diene-3,20-dione,
6α-fluoro-16α,17α-(1',1'-difluoro)ethylenepregna-1,4-diene-3,20-dione, and
6α-trifluoromethyl-16α,17α-ethylenepregna-1,4-diene-3,20-dione, respectively.

EXAMPLE 13

To a solution of 1 g. of 3-acetoxy-16α,17α-ethylene-pregn-5-en-20-one in 20 ml. of tetrahydrofuran, cooled to 0° C., is added 1.05 molar equivalents of 2,3-dichloro-5,6 - dicyano - 1,4 - benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 16α,17α-ethylene-pregna-4,6-diene-3,20-dione which may be further purified through recrystallization from acetone:hexane.

To a stirred and refluxing solution of 1 g. of 16α,17α-ethylenepregna-4,6-diene-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-16α,17α-ethylenepregn-4-ene-3,20-dione.

Using the same procedure the following compounds, namely 3-acetoxy-16α,17α-(1',1'-dimethyl)ethylenepregn-5-en-20-one,
3-acetoxy-16α,17α-ethylene-19-norpregn-5-en-20-one,
3-acetoxy-16α,17α-tetrafluoroethylenepregn-5-en-20-one, and
3-acetoxy-16α,17α-(1',1'-dimethoxy)ethylenepregn-5-en-20-one are converted to
6α,7α-difluoromethylene-16α,17α-(1',2'-dimethyl)ethylenepregn-4-ene-3,20-dione,
6α,7α-difluoromethylene-16α,17α-ethylene-19-norpregn-4-ene-3,20-dione,
6α,7α-difluoromethylene-16α,17α-tetrafluoroethylenepregn-4-ene-3,20-dione and
6α,7α-difluoromethylene-16α,17α-(1',1'-dimethoxy)-ethylenepregn-4-ene-3,20-dione, respectively.

EXAMPLE 14

A solution of 1 g. of sodium borohydride in 3 ml. of water is added to an ice-cooled solution of 1 g. of 16α,17α-ethylenepregna-4,6-diene-3,20-dione in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 16a,17a-ethylenepregna-4,6-diene-3,20-diol which may be further purified by recrystallization from acetone: hexane.

A solution of 0.5 g. of 16α,17α-ethylenepregna-4,6-diene-3,20-diol in 5 ml. of dimethylsulfoxide is added to a solution of one equivalent of dimethylsulfoxonium methylide in dimethylsulfoxide, prepared in the manner of Corey et al., J. Am. Chem. Soc., 87, 1353 (1965). The mixture is stirred under nitrogen at room temperature for 20 hours and then at 50° C. for 7 hours. Fifty milliliters of water are then added and the resulting mixture extracted four times with 50 ml. of ethyl acetate. The combined extracts are washed with water and saturated aqueous sodium chloride solution, dried over sodium sulfate and evaporated to dryness. This residue is then chromatographed on silica, eluting with ether:methylene chloride to yield 6α,7α-methylene-16α,17α-ethylenepregn-4-ene-3,20-diol.

One gram of 6α,7α-methylene-16α,17α-ethylenepregn-4-ene-3,20-diol in 100 ml. of chloroform is stirred for 18 hours at room temperature with 10 g. of freshly precipitated manganese dioxide. The inorganic material is then removed by filtration and washed with hot chloroform and the combined filtrate and washings are evaporated to yield 6α,7α - methylene-16α,17α-ethylene-20-hydroxypregn-4-en-3-one. This material in 120 ml. of pyridine is then added to a mixture of 6 g. of chromic trioxide in 20 ml. of pyridine. The mixture is allowed to stand at room temperature for 15 hours. The inorganic material is removed by filtration and the filtrate evaporated to dryness to yield 6α,7α-methylene-16α,17α-ethylenepregn-4-ene-3,20-dione.

Using the same procedure, other $\Delta^{4,6}$-diene intermediates are converted to their corresponding 6α,7α-methylene analogs. Notably among these are the following:

6α,7α-methylene-16α,17α-(1',2'-dimethyl)ethylenepregn-4-ene-3,20-dione,
6α,7α-methylene-16α,17α-ethylene-19-norpregn-4-ene-3,20-dione,
6α,7α-methylene-16α,17α-tetrafluoroethylenepregn-4-ene-3,20-dione and
6α,7α-methylene-16α,17α-(1',1'-dimethoxy)ethylenepregn-4-ene-3,20-dione.

Using the same procedure, $\Delta^1$-ene compounds are converted to the corresponding 1α,2α-methylene compounds. Notably among these are the following: 1α,2α-methylene-16α,17α-ethylene-5α-pregnane-3,20-dione and 1α,2α-methylene-16α,17α-ethylene-5α-19-norpregnane-3,20-dione.

EXAMPLE 15

A mixture of 1 g. of 6-chloro-16α,17α-ethylenepregna-4,6-diene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 6-chloro-16α,17α-ethylenepregna - 1,4,6 - triene-3,20-dione which may be further purified through recrystallization from acetone:hexane.

Using the same procedure the final products of Example 11 are converted to their respective $\Delta^{1,4,6}$-triene analogs, respectively.

EXAMPLE 16

A solution of 1 g. of 6α-chloro-16α,17α-ethylenepregn-4-ene-3,20-dione in 50 ml. of tetrahydrofuran is added over a 30-minute period to a stirred suspension of 1 g. of lithium aluminum hydride in 50 ml. of anhydrous tetrahydrofuran, and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3β-hydroxy-6α-chloro-16α,17α-ethylenepregn-4-en-20-one which may be further purified through recrystallization from acetone: hexane.

Two milliliters of dihydropyran are added to a solution of 1 g. of 3β-hydroxy-6α-chloro-16α,17α-ethylenepregn-4-en-20-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-tetrahydropyranyloxy-6α-chloro-16α,17α-ethylenepregn-4-en-20-one which is recrystallized from pentane.

Using the same procedure, the following 3-tetrahydropyranyloxy compounds of the present invention are prepared. Notably among these are the following:

3-tetrahydropyranyloxy-6α-chloro-16α,17α-tetrafluoroethylenepregn-4-en-20-one,
3-tetrahydropyranyloxy-16α,17α-ethylene-19-norpregn-4-en-20-one and
3-tetrahydropyranyloxy-6α-chloro-16α,17α-tetrafluoroethylene-19-norpregn-4-en-20-one,
1α,2α-difluoromethylene-3-tetrahydropyranyloxy-6-chloro-16α,17α-ethylenepregna-4,6-dien-20-one.

EXAMPLE 17

A solution of 1 g. of 1α,2α-difluoromethylene-16α,17α-ethylenepregn-4-ene-3,20-dione in 50 ml. of tetrahydrofuran is added over a 30-minute period to a stirred suspension of 1 g. of lithium aluminum hydride in 50 ml. of anhydrous tetrahydrofuran, and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 1α,2α-difluoromethylene-3β-hydroxy - 16α,17α - ethylenepregn-4-en-20-one which may be further purified through recrystallization from acetone:hexane.

A mixture of 1 g. of 1α,2α-difluoromethylene-3β-hydroxy-16α,17α-ethylenepregn-4-en-20-one, 4 ml. of pyridine and 2 ml. of acetic anhydride is allowed to stand at room temperature for 15 hours. The mixture is then poured into ice water and the solid which forms is collected by filtration, washed with water and dried to yield 1α,2α-difluoromethylene-3β-acetoxy - 16α,17α - ethylenepregn-4-en-20-one which may be further purified through recrystallization from acetone:hexane.

Using the same procedure and starting material but utilizing propionic anhydride and then cyclopentylpropionic anhydride in place of acetic anhydride the corresponding 3β-propionate and 3β-cyclopentylpropionate are obtained, respectively.

EXAMPLE 18

To a stirred solution of 1 g. of 6α-chloro-16α,17α-ethylenepregn-4-ene-3,20-dione in 40 ml. of dioxane is added in a dropwise fashion a solution containing 1.2 molar equivalents of bromine in dioxane at a temperature of 15° C. The mixture is allowed to stand at room temperature for 30 minutes and then poured into 5% aqueous sodium bicarbonate solution and extracted with chloroform. These extracts are washed with water, dried over sodium sulfate and evaporated under reduced pressure, to yield 6α-chloro-16α,17α-ethylene-21-bromopregn-4-ene-3,20-dione which is further purified through recrystallization from methylene chloride:hexane.

To a stirred solution of the bromo intermediate in 40 ml. of dimethylformamide is added a 1.1 molar equivalent of lithium chloride. The reaction mixture is held at 100° C. for a period of 2 hours, poured into ice water, and extracted with chloroform. The organic phase is washed with water, dried and evaporated to dryness to yield 6α- chloro-16α,17α-ethylene-21-chloropregn - 4 - ene - 3,20-dione.

Using the same procedure the starting compounds namely 6α-chloro-16α,17α-tetrafluoroethylene - 19 - norpregn-4-ene-3,20-dione, 6α - trifluoromethyl-16α,17α-tetrafluoroethylene-19-norpregn-4-ene-3,20-dione and 6α - fluoro-16α,17α-ethylenepregn-4-en-3,20-dione are converted to the corresponding 21-chloro compounds.

EXAMPLE 19

The 6α-chloro-16α,17α-ethylene-21-bromopregn-4-ene-3,20-dione is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 6α-chloro-16α,17α-ethylene-21-fluoropregn-4-ene-3,20-dione which is recrystallized from methanol:acetone.

Using the same procedure those 21-bromo compounds of Example 18 are converted to their 21-fluoro analogs, respectively.

What is claimed is:

1. A compound of the formula

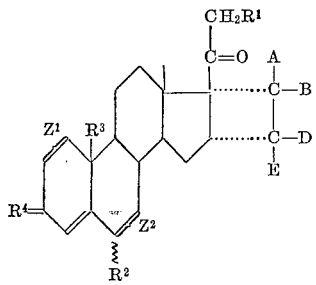

wherein $Z^1$ is a carbon-carbon single bond, a carbon-carbon double bond or the group

bridging the C–1 and C–2 carbon atoms, each of X and Y being hydrogen, chloro or fluoro;

$Z^2$ is a carbon-carbon single bond, a carbon-carbon double bond or the group

bridging the C–6 and C–7 carbon atoms, each of X' and Y' being hydrogen, chloro or fluoro;

$R^1$ is hydrogen, chloro or fluoro;

$R^2$ is hydrogen, fluoro, chloro, methyl or trifluoromethyl;

$R^3$ is hydrogen or methyl; $R^3$ being methyl when $Z^1$ is a carbon-carbon double bond;

$R^4$ is an oxygen atom or the group,

in which $R^5$ is hydrogen, tetrahydropyranyl or a hydrocarbon carboxylic acyl group of less than 12 carbon atoms;

each of A and B is hydrogen, chloro, fluoro or an alkyl group of from 1 to 4 carbon atoms;

each of D and E is hydrogen, chloro, fluoro, phenyl, an alkyl group of from 1 to 4 carbon atoms, an alkoxy group of from 1 to 4 carbon atoms or a haloalkyl group of from 1 to 4 carbon atoms; and A and B or D and E taken together are methylene or difluoromethylene, provided that $Z^1$ is a carbon-carbon single bond or a carbon-carbon double bond whenever $Z^2$ is the group

2. Compounds of claim 1 wherein
$R^1$ is hydrogen;
$R^2$ is hydrogen or chloro;
$R^4$ is oxygen or the group

in which $R^5$ is hydrogen, tetrahydropyranyl or acetyl;
$Z^1$ is a carbon-carbon single bond;
$Z^2$ is a carbon-carbon single bond or a carbon-carbon double bond;
each of A, B, D and E is hydrogen or fluoro and
$R^3$ is as therein defined.

3. Compound of claim 2 wherein
$R^2$ is hydrogen;
$R^3$ is methyl;
$R^4$ is oxygen;
$Z^2$ is a carbon-carbon single bond; and
each of A, B, D and E is hydrogen.

4. Compound of claim 2 wherein
$R^2$ is chloro;
$R^3$ is methyl;
$Z^2$ is a carbon-carbon double bond; and
each of A, B, D and E is hydrogen.

5. Compound of claim 2 wherein
$R^2$ is hydrogen;
$R^3$ is methyl;
$R^4$ is oxygen;
$Z^2$ is a carbon-carbon single bond;
each of A, B, D and E is fluoro.

6. Compound of claim 2 wherein
each of $R^2$ and $R^3$ is hydrogen;
$R^4$ is oxygen;
$Z^2$ is a carbon-carbon double bond; and
each of A, B, D and E is hydrogen.

7. Compounds of claim 2 wherein
$R^2$ is chloro;
$R^3$ is hydrogen;
$Z^2$ is a carbon-carbon double bond; and
each of A, B, D and E is hydrogen.

8. Compound of claim 1 wherein
$R^1$ is hydrogen;
$R^2$ is chloro;
$R^3$ is methyl;
$R^4$ is oxygen;
$Z^1$ is the group

bridging the C–1 and C–2 carbon atoms, each of X and Y being hydrogen;
$Z^2$ is a carbon-carbon double bond; and
each of A, B, D and E is hydrogen.

9. Compound of claim 1 wherein
$R^1$ is hydrogen;
$R^2$ is chloro;
$R^3$ is methyl;
$R^4$ is oxygen;
$Z^1$ is the group

bridging the C–1 and C–2 carbon atoms, each of X and Y being hydrogen;
$Z^2$ is a carbon-carbon double bond;
each of A and B is hydrogen; and
each of D and E is fluoro.

10. Compound of claim 1 wherein
$R^1$ is hydrogen;
$R^2$ is methyl;
$R^3$ is methyl;
$R^4$ is oxygen;
$Z^1$ is a carbon-carbon single bond;
$Z^2$ is a carbon-carbon double bond; and
each of A, B, D and E is hydrogen.

11. Compound of claim 1 wherein
each of $R^1$ and $R^2$ is hydrogen;
$R^3$ is methyl;
$R^4$ is oxygen;
$Z^1$ is a carbon-carbon single bond;
$Z^2$ is the group $$\overset{\cdot\cdot}{\underset{\cdot\cdot}{>}}CX'Y'$$

bridging the C-6 and C-7 carbon atoms, each of X' and Y' being fluoro; and
each of A, B, D and E is hydrogen.

12. Compound of claim 1 wherein
$R^1$ is hydrogen;
$R^2$ is chloro;
$R^3$ is methyl;
$R^4$ is oxygen;
$Z^1$ is the group $$\overset{\cdot\cdot}{\underset{\cdot\cdot}{>}}CXY$$

bridging the C-1 and C-2 carbon atoms, each of X and Y being fluoro;
$Z^2$ is a carbon-carbon double bond; and
each of A, B, D and E is hydrogen.

13. Compound of claim 1 wherein
$R^1$ is hydrogen;
$R^2$ is fluoro;
$R^3$ is methyl;
$R^4$ is oxygen;
$Z^1$ is a carbon-carbon single bond;
$Z^2$ is a carbon-carbon double bond; and
each of A, B, D and E is hydrogen.

14. Compound of claim 1 wherein
each of $R^1$ and $R^2$ is hydrogen;
$R^3$ is methyl;
$R^4$ is oxygen;
$Z^1$ is a carbon-carbon double bond;
$Z^2$ is the group $$\overset{\cdot\cdot}{\underset{\cdot\cdot}{>}}CX'Y'$$

bridging the C-6 and C-7 carbon atoms, each of X' Y' being fluoro; and
each of A, B, D and E is hydrogen.

15. Compound of claim 1 wherein
$R^1$ is hydrogen;
$R^2$ is methyl;
$R^3$ is methyl;
$R^4$ is oxygen;
each of $Z^1$ and $Z^2$ is a carbon-carbon single bond;
each of A, B, D and E is hydrogen.

16. A compound selected from the group consisting of

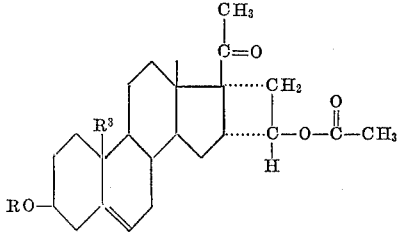

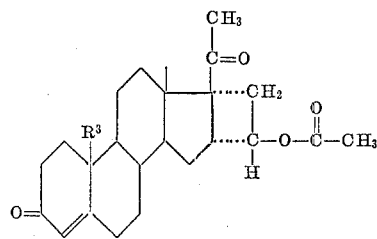

and

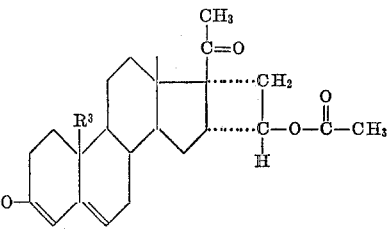

wherein R is hydrogen or acetyl and $R^3$ is hydrogen or methyl.

References Cited

UNITED STATES PATENTS 3,338,928    8/1967    Beard et al.

HENRY A. FRENCH, *Primary Examiner.*

U.S. Cl. X.R.

260—239.55, 397.4, 397.47, 397.5, 999